(12) United States Patent
Nakamae

(10) Patent No.: US 6,221,952 B1
(45) Date of Patent: *Apr. 24, 2001

(54) AQUEOUS EMULSION COMPOSITION

(75) Inventor: Masato Nakamae, Okayama-Pref (JP)

(73) Assignee: Kuraray Co., Ltd., Kurashiki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/093,343

(22) Filed: Jun. 9, 1998

(30) Foreign Application Priority Data

Jun. 9, 1997 (JP) .................................................. 9-150572

(51) Int. Cl.$^7$ ............................... C08J 3/05; C08L 29/04; C08F 2/20; C08F 218/04; C08F 218/08

(52) U.S. Cl. .......................... 524/503; 524/459; 524/167; 526/330; 526/331; 525/56; 525/57; 525/58; 525/60

(58) Field of Search .................................. 525/56, 58, 57, 525/60, 59; 524/503, 459, 167; 526/330, 331

(56) References Cited

U.S. PATENT DOCUMENTS

| 3,721,557 | * | 3/1973 | Inoue | ................................... | 430/257 |
| 5,849,831 | * | 12/1998 | Takada | ................................. | 524/459 |

FOREIGN PATENT DOCUMENTS

| 24 45 813 | | 4/1976 | (DE) . |
| 50-126750 | * | 10/1975 | (JP) . |
| 54-36329 | | 3/1979 | (JP) . |
| 55-99907 | | 7/1980 | (JP) . |
| 62-199636 | | 9/1980 | (JP) . |
| 6-211911 | | 8/1994 | (JP) . |

OTHER PUBLICATIONS

Yuki et al 1976:91019, File HCAPLUS of STN Database Service, Chemical Abstracts, American Chemical Society, 1976, p. 66–67 (English Abstract of JP50126750).*
Yuki et al 77–78064 Y/44, On line Derwent Abstract, File WPAT, (English abstract of JP 50126750), 1977.*
Ando et al 1990:120410, File HCAPLUS of STN Database Service, Chemical Abstracts, American Chemical Society, 1990, p. 56–58 (English abstract of JP 01266114).*

* cited by examiner

*Primary Examiner*—Hoa Van Le
*Assistant Examiner*—Sin J. Lee
(74) *Attorney, Agent, or Firm*—Oblon, Spivak, McClelland, Maier & Neustadt, P.C.

(57) ABSTRACT

An aqueous emulsion composition is provided that includes, as the dispersoid, a (co)polymer that contains at least one monomer unit selected from ethylenic unsaturated monomers and dienic monomers, and, as the dispersant, (A) a polyvinyl alcohol (co)polymer, and (B) a condensate of an alkali metal salt of an aromatic sulfonic acid with formaldehyde in a ratio, (A)/(B), of from 100/0.05 to 100/100 in terms of the solid content of the two. The composition is characterized by its fluidity such that the apparent viscosity of the composition is prevented from being lowered relative to the increase in the shear rate of the composition, and that the apparent viscosity of the composition is increased relative to the increase in the shear rate thereof. In addition, the composition has excellent high initial adhesiveness and viscosity-increasing ability.

21 Claims, No Drawings

AQUEOUS EMULSION COMPOSITION

BACKGROUND OF THE INVENTION

1. Field of the Invention

The present invention relates to an aqueous emulsion composition, an adhesive, and a method for thickening an aqueous emulsion.

2. Discussion of the Background

An aqueous emulsion having as the dispersant, a polyvinyl alcohol polymer (hereinafter referred to as PVA polymer) has extremely high mechanical stability, chemical stability and miscibility with pigment, as the PVA polymer acts as protective colloid. In addition, films formed from these aqueous emulsions are extremely stiff. Aqueous emulsions have many applications in various fields of coating compositions, adhesives, fiber processing agents, paper processing agents, etc.

An aqueous emulsion having a PVA polymer as the dispersant is characterized by so-called shear thinning (hereinafter referred to as thixotropy), which generally indicates the decrease in the apparent viscosity of a fluid with the increase in the shear rate. In practical uses of such aqueous emulsions, shear-thinning is often preferred.

Recently, it is desirable to speed up production of products e.g., wood bonded products, paper bonded products, fiber products, etc. made from an aqueous emulsion having a PVA polymer as the dispersant. This is typically accomplished, for example, by accelerating the speed of roll rotation in the line. In this situation, the conventional, shear-thinning aqueous emulsion has problems because it is difficult to control the amount of emulsion applied to the rolls and, after it has been applied, the emulsion scatters around the rolls.

To solve these problems, an aqueous emulsion is often processed into a Newtonian one wherein the apparent viscosity does not depend on the shear rate, or into a shear-thickening one wherein the apparent viscosity increases with an increase in shear rate (the latter may be hereinafter referred to as dilatant fluid).

To convert a thixotropic, aqueous emulsion having a PVA polymer as the dispersant into a Newtonian one, for example, the emulsion polymerization method for producing the emulsion may be improved by controlling the amount of the initiator and the dispersant, or the PVA polymer may be defined with respect to the degree of hydrolysis and molecular weight.

Where such a Newtonian, aqueous emulsion is desired to be further converted into a dilatant one, it is generally difficult to convert the viscosity or fluidity of the emulsion by merely improving the emulsion polymerization method or specifically defining the PVA polymer to be used as the dispersant in the manner as above while the dispersion stability of the aqueous emulsion is still kept stable. For this, therefore, to convert the thixotropic emulsion into a dilatant one, it may be possible to employ a method of adding to an aqueous emulsion having a thixotropic PVA polymer as the dispersant, a gelling agent for the PVA polymer in the step of post-processing the emulsion. However, this method has problems because the gelling agent is not safe and would unfavorably color the emulsion. In addition, the use of the emulsion produced would be limited.

Japanese Patent Application Laid-Open (JP-A) No. Hei-6-211911 discloses an aqueous copolymer emulsion for processing paper, which is obtained by emulsion polymerization using a naphthalenesulfonate-formaldehyde condensate and a polyoxyethylene alkylphenyl ether sulfate, and is characterized by its high-speed coatability. The laid-open patent application discloses that PVA may be optionally added to the emulsion, but is silent regarding the meaning of the combination of PVA and the naphthalenesulfonate-formaldehyde condensate, the compositional ratio of the two in the emulsion, and the amount of PVA being larger than that of the condensate in the emulsion.

SUMMARY OF THE INVENTION

Accordingly, the first object of the present invention is to provide an aqueous emulsion composition which is free from the problems noted above and in which the apparent viscosity relative to the shear rate is prevented from being lowered or is increased.

The second object of the invention is to provide an adhesive that contains the aqueous emulsion composition, which has excellent initial adhesiveness.

The third object of the invention is to provide a method for thickening an aqueous emulsion.

The first embodiment of the invention relates to an aqueous emulsion composition, including: a dispersoid, containing a (co)polymer polymerized from at least one monomer unit selected from the group consisting of ethylenic unsaturated monomers, dienic monomers, and mixtures thereof; a dispersant, containing: (A) a polyvinyl alcohol (co)polymer, and (B) a condensate of an alkali metal salt of an aromatic sulfonic acid with formaldehyde; wherein a weight ratio of the solid content of (A)/(B) is 100/0.05 to 100/100.

The second embodiment of the invention relates to an adhesive, including the aqueous emulsion composition described above.

The third embodiment of the invention relates to a method for thickening an aqueous emulsion, including: adding to an aqueous emulsion a condensate (B) of an alkali metal salt of an aromatic sulfonic acid with formaldehyde.

The fourth embodiment of the invention relates to a method of preparing the above-described aqueous emulsion composition, including: in the presence of a dispersant containing (A) a polyvinyl alcohol, preparing a (co)polymer dispersoid by emulsion (co)polymerizing at least one monomer unit selected from the group consisting of ethylenic unsaturated monomers, dienic monomers, and mixtures thereof; and adding (B) a condensate of an alkali metal salt of an aromatic sulfonic acid with formaldehyde; wherein a weight ratio of the solid content of (A)/(B) is 100/0.05 to 100/100.

DESCRIPTION OF PREFERRED EMBODIMENTS

Other features of the invention will become apparent in the course of the following description of preferred embodiments, which are not intended to be limiting.

The aqueous emulsion composition of the invention comprises, a dispersed (co)polymer (hereinafter dispersoid) that comprises at least one monomer unit selected from ethylenic unsaturated monomers and dienic monomers.

The ethylenic unsaturated monomers and dienic monomers for the dispersoid are not particularly limiting. As preferred examples of ethylenic unsaturated monomers for use in the invention, mentioned are olefins such as ethylene, propylene, isobutylene, etc.; halogenated olefins such as vinyl chloride, vinyl fluoride, vinylidene chloride, vinylidene fluoride, etc.; vinyl esters such as vinyl formate, vinyl acetate, vinyl propionate, vinyl versatate, etc.; acrylic acid, methacrylic acid; acrylates such as methyl acrylate, ethyl acrylate, butyl acrylate, 2-ethylhexyl acrylate, dodecyl acrylate, 2-hydroxyethyl acrylate, etc.; methacrylates such as methyl methacrylate, ethyl methacrylate, butyl methacrylate, 2-ethylhexyl methacrylate, dodecyl methacrylate, 2-hydroxyethyl methacrylate, etc.; dimethylaminoethyl acrylate, dimethylaminoethyl methacrylate and their quaternary derivatives; acrylamide-type monomers such as acrylamide, methacrylamide, N-methylolacrylamide, N,N-dimethylacrylamide, acrylamido-2-methylpropanesulfonic acid and its sodium salt, etc.; styrenic monomers such as styrene, α-methylstyrene, p-styrenesulfonic acid and its sodium and potassium salts, etc.; N-vinylpyrrolidone, etc. Preferred examples of dienic monomers for use in the invention include butadiene, isoprene, chloroprene, etc. Those monomers may be used either singly or combined. Preferred examples of (co)polymers comprising at least one of those monomers for use in the invention are vinyl ester-based (co)polymers such as ethylene-vinyl acetate copolymer and polyvinyl acetate, as well as (meth)acrylate-based (co)polymers, styrene-diene-based copolymers, etc.

The aqueous emulsion composition of the invention comprises a PVA polymer as the dispersant.

The types of PVA polymer suitable for the dispersant are not particularly limiting. Preferably, the PVA polymer is prepared by polymerizing a vinyl ester monomer such as vinyl acetate followed by hydrolyzing the resulting polymer.

In addition to vinyl acetate, other vinyl ester monomers suitable for the invention include vinyl formate, vinyl propionate, vinyl versatate, vinyl pivalate, etc.

The PVA polymer dispersant that constitutes the aqueous emulsion composition of the invention may also be a copolymer which is prepared by copolymerizing a vinyl ester monomer and a comonomer capable of copolymerizing with the monomer, so far as the comonomer does not interfere with the effect of the invention. The comonomer preferably includes, for example, olefins such as ethylene, propylene, 1-butene, isobutene, etc.; acrylic acid and its esters such as methyl acrylate, ethyl acrylate, n-propyl acrylate, i-propyl acrylate, n-butyl acrylate, t-butyl acrylate, 2-ethylhexyl acrylate, dodecyl acrylate, octadecyl acrylate, etc.; methacrylic acid and its esters such as methyl methacrylate, ethyl methacrylate, n-propyl methacrylate, i-propyl methacrylate, n-butyl methacrylate, t-butyl methacrylate, 2-ethylhexyl methacrylate, dodecyl methacrylate, octadecyl methacrylate, etc.; vinyl ethers such as methyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, etc.; nitriles such as acrylonitrile, methacrylonitrile, etc.; halogenated vinyl compounds such as vinyl chloride, vinylidene chloride, vinyl fluoride, vinylidene fluoride, etc.; allyl compounds such as allyl acetate, allyl chloride, etc.; carboxyl group-containing compounds such as fumaric acid, maleic acid, itaconic acid, maleic anhydride, phthalic anhydride, trimellitic anhydride, itaconic anhydride, etc.; esters of the above carboxyl group-containing compounds; sulfonic acid group-containing compounds such as ethylenesulfonic acid, allylsulfonic acid, methallylsulfonic acid, 2-acrylamido-2-methylpropanesulfonic acid, etc.; vinylsilane compounds such as vinyltrimethoxysilane, etc.; isopropenyl acetate, 3-acrylamidopropyltrimethylammonium chloride, 3-methacrylamidopropyltrimethylammonium chloride, etc.

Also employable herein are terminal-modified PVA polymers, which are prepared by polymerizing a vinyl ester monomer such as vinyl acetate or the like such as described above in the presence of a thiol compound such as thiolacetic acid, mercaptopropionic acid or the like followed by hydrolyzing the resulting polymer.

The degree of polymerization of the dispersant, PVA polymer that constitutes the aqueous emulsion composition of the invention is not particularly limiting, but is preferably between 50 and 8000, more preferably between 100 and 4000, most preferably between 200 and 3500. Those having a degree of polymerization larger than 8000 are unfavorable, since they increase the viscosity of aqueous emulsions and lower the dispersion stability thereof. The degree of hydrolysis of the PVA polymer for use in the invention is not also particularly limiting, but may be generally not smaller than 50 mol %, preferably not smaller than 60 mol %, more preferably not smaller than 70 mol %, in view of the water-solubility of the polymer. The uppermost limit of the degree of hydrolysis may be 100 mol %, but is preferably up to 98 mol %, more preferably up to 96 mol %. All of the above ranges include all values and subranges therebetween.

The condensate of an alkali metal salt of an aromatic sulfonic acid with formaldehyde, which is in the aqueous emulsion composition of the invention, is not particularly limiting and may be selected from any and every type of condensates of an alkali metal salt of an aromatic sulfonic acid with formaldehyde known in the art. Preferably used are sodium naphthalenesulfonate-formaldehyde condensate, sodium benzenesulfonate-formaldehyde condensate, and sodium lignosulfonate-formaldehyde condensate. The sodium naphthalenesulfonate includes sodium α-naphthalenesulfonate and sodium β-naphthalenesulfonate. Of those formaldehyde condensates, the best is sodium naphthalenesulfonate-formaldehyde condensate. The condensate for use in the invention shall preferably be soluble or dispersible in water, while preferably having at least two units of an alkali metal salt of an aromatic sulfonic acid in one molecule. The degree (n) of condensation of the condensate is preferably from 2 to 20, more preferably from 4 to 18, most preferably from 8 to 16. These ranges include all values and subranges therebetween.

As the component (B) to be in the aqueous emulsion composition of the invention, also preferable is a condensate of an alkali metal salt of a heterocyclic sulfonic acid with formaldehyde, such as a condensate of an alkali metal melaminesulfonate with formaldehyde or the like.

In the aqueous emulsion composition of the invention, the ratio of the PVA polymer (A) to the condensate of an alkali metal salt of an aromatic sulfonic acid with formaldehyde (B), (A)/(B), must be from 100/0.05 to 100/100 in terms of the solid content of the two. If the amount of (B) to be in the composition is small, overstepping the ratio, (A)/(B)=100/0.05, the invention could not attain the intended effect i.e., the effect of preventing the apparent viscosity of the aqueous emulsion composition, relative to the shear rate thereof, from being lowered, or the effect of increasing the apparent viscosity of the composition. In addition, if the ratio is overstepped, the initial adhesiveness of the adhesive comprising the composition will be poor. On the other hand, if the amount of (B) is large, not reaching the ratio, (A)/(B)= 100/100, the water resistance of the film formed from the aqueous emulsion composition will be poor and, in addition, the composition will undesirably coagulate. Preferably, the (A)/(B) ratio is from 100/0.1 to 100/80 and more preferably from 100/0.2 to 100/50.

The aqueous emulsion composition of the invention shall contain, as the dispersoid, a (co)polymer having at least one monomer unit selected from ethylenic unsaturated monomers and dienic monomers, while containing (A) a polyvinyl alcohol polymer and (B) a condensate of an alkali metal salt of an aromatic sulfonic acid with formaldehyde in a ratio, (A)/(B), of from 100/0.05 to 100/100 in terms of the solid content of the two. The method for producing the composition is not particularly limiting. To produce the composition, for example, preferable is a method of (co)polymerizing at least one monomer selected from ethylenic unsaturated monomers and dienic monomers in the presence of a PVA polymer and a condensate of an alkali metal salt of an aromatic sulfonic acid with formaldehyde in any conventional manner of emulsion (co)polymerization; a method of adding a condensate of an alkali metal salt of an aromatic sulfonic acid with formaldehyde to an aqueous emulsion as previously prepared by (co)polymerizing at least one monomer selected from ethylenic unsaturated monomers and dienic monomers in the presence of a PVA polymer in any conventional manner of emulsion (co)polymerization; or a method of adding a PVA polymer to an aqueous emulsion as previously prepared by (co)polymerizing at least one monomer selected from ethylenic unsaturated monomers and dienic monomers in the presence of a condensate of an alkali metal salt of an aromatic sulfonic acid with formaldehyde in any conventional manner of emulsion (co)polymerization. Of the above methods, preferred is the method of adding the condensate of an alkali metal salt of an aromatic sulfonic acid with formaldehyde (B) to the aqueous emulsion for thickening the emulsion. According to this thickening method, the aqueous emulsion is thickened, i.e., the viscosity of the emulsion is increased: the coatability of the thus-thickened emulsion is improved and the adhesiveness of an adhesive comprising the emulsion is also improved. Specifically, according to the thickening method, an aqueous emulsion composition is obtained that is especially useful in the field of adhesives that require increased viscosity for their coatability and adhesiveness.

In the aqueous emulsion composition of the invention, the total weight of (A) and (B) is preferably from 1 to 50 parts by weight, more preferably from 2 to 30 parts by weight, relative to 100 parts by weight of the dispersoid (co)polymer that comprises at least one monomer selected from ethylenic unsaturated monomers and dienic monomers. These ranges include all values and subranges therebetween. In order to prevent the dispersion stability of the composition from being lowered, to prevent the viscosity of the composition from being too much increased, to prevent the water resistance of the film of the composition from being lowered, and to prevent the initial adhesiveness of the adhesive comprising the composition from being lowered, the total weight of (A) and (B) is preferably kept within the above ranges.

Preferably, the emulsion (co)polymerization for obtaining the aqueous emulsion composition of the invention may be attained by adding at least one monomer selected from ethylenic unsaturated monomers and dienic monomers, all at once or continuously, to the emulsion (co)polymerization system. The monomer(s) to be (co)polymerized may be first emulsified in an aqueous solution of the dispersant for emulsion (co)polymerization, and the resulting emulsion may be added continuously to the emulsion (co)polymerization system.

Any conventional initiator known in the art may be used in the emulsion (co)polymerization. For example, preferable are any water-soluble initiators such as persulfates, hydrogen peroxide, tert-butyl hydroperoxide and the like, as well as azo- or peroxide-, oil-soluble initiators. These may be used singly or as combined with a reducing agent, such as tartaric acid, ascorbic acid, Rongalit, ferric ion or the like, in the form of a redox initiator system.

The emulsion (co)polymerization temperature is not particularly limiting, as varying depending on the type of the initiator used, but may be generally selected from the range between −20° C. and 100° C., preferably −10° C. and 90° C. and 80° C. These ranges include all values and subranges therebetween.

The aqueous emulsion composition of the invention thus prepared in the manner mentioned hereinabove is a Newtonian or dilatant fluid. The terminology "dilatancy" as referred to herein indicates that the ratio of the viscosity at 30° C. of the fluid at 6 rpm to that at 60 rpm, (6 rpm)/(60 rpm), is smaller than 1, as concretely demonstrated in Examples to be mentioned hereinunder.

The aqueous emulsion composition of the invention may contain, if desired, any conventional anionic, nonionic, cationic or amphoteric surfactants; water-soluble polymer compounds such as starch, modified starch, oxidized starch, sodium alginate, carboxymethyl cellulose, methyl cellulose, hydroxymethyl cellulose, maleic anhydride/isobutene copolymer, maleic anhydride/styrene copolymer, maleic anhydride/methyl vinyl ether copolymer, etc.; and thermosetting resins such as urea/formaldehyde resin, urea/melamine/formaldehyde resin, phenol/formaldehyde resin, etc.

Also if desired, the composition may further contain various additives, for example, fillers such as clay, kaolin, talc, calcium carbonate, wood powder, etc.; vehicles such as wheat flour, etc.; pigments such as titanium oxide, etc.; and other various preservatives, rust inhibitors, anti-foaming agents, etc.

The aqueous emulsion composition of the invention preferably has a solid content of from 20 to 75% by weight. If its solid content is lower than 20% by weight, the composition is often problematic in that it may dry too quickly in practical use. However, if higher than 75% by weight, the composition is also problematic in that its viscosity is too high and its dispersion stability may be poor.

The aqueous emulsion composition of the invention is favorably applicable to high-speed production lines for producing products from the composition. In addition, the composition is also favorably used in various fields of adhesives for paper (for example, for paper tubes, pastes for tobacco chips, ordinary paper works, etc.), adhesives for wood works, fiber processing agents, coating compositions and others that require high initial adhesiveness.

EXAMPLES

Now, the invention is described in more detail with reference to the following Examples and Comparative Examples, which, however, are not intended to restrict the scope of the invention. Unless otherwise specifically indicated, "parts" and "%" in Examples and Comparative Examples are by weight. The fluidity, the initial adhesiveness and the degree of thickening of the aqueous emulsion samples prepared herein were measured and evaluated according to the methods mentioned below.

Evaluation of Fluidity of Aqueous Emulsion:

Using a BM viscometer, the viscosity at 30° C. of each sample was measured at 60 rpm and at 6 rpm, and the ratio, (viscosity at 6 rpm)/(viscosity at 60 rpm) was obtained, which indicates the fluidity of the sample.

Evaluation of Initial Adhesiveness of Adhesive:

Using an initial adhesiveness tester (ASM-01 Model, manufactured by Japan Tobacco Industry Co.), the initial adhesiveness of each sample was measured under the condition mentioned below.

Material bonded: Two sheets of kraft paper (Olympus 95) were bonded together.
Amount of sample applied: 100 g/m² (wet weight).
Mode for measurement: Shearing.
Speed for measurement: 300 mm/min.
Time for which the coated sample was left: 1 sec.
Bonding time: 5 sec.
Bonding temperature: 20° C.
Bonding pressure: 10 kg.
Time for which the bonded sample was left: 1 sec.

Evaluation of Degree of Thickening of Aqueous Emulsion:

Using a BM viscometer, the viscosity at 30° C. of each sample having a solid concentration of 45% was measured at 6 rpm before and after thickening the sample. The ratio of the viscosity of the thickened sample to that of the non-thickened sample was obtained to be a viscosity-increasing magnification, which indicates the degree of thickening of the sample.

Viscosity-increasing Magnification=(viscosity of thickened emulsion)/(viscosity of non-thickened emulsion)

Example 1

320 g of water and 20 g of polyvinyl alcohol (PVA-1, having a degree of polymerization of 1700 and a degree of hydrolysis of 88.0 mol %) were put into a 1-liter glass polymerizer equipped with a reflux condenser, a dropping funnel, a thermometer and a nitrogen blow inlet, and completely dissolved at 95° C.

Next, the resulting aqueous PVA solution was cooled, and purged with nitrogen. Then, with stirring the solution at 140 rpm, 40 g of vinyl acetate was added thereto, and heated up to 60° C. Next, 10 g of an aqueous solution of 10% tartaric acid was added to this, and an aqueous solution of 1% hydrogen peroxide was continuously and dropwise added thereto to initiate the polymerization of the monomer. After 0.5 hours, the temperature of the reaction system was elevated up to 80° C., and 360 g of vinyl acetate was continuously and dropwise added to the system. The addition of vinyl acetate was finished in 2 hours, during which 50 g of an aqueous solution of 1% hydrogen peroxide was continuously added thereto. Thus was obtained a polyvinyl acetate emulsion (Em-1) having a solid concentration of 52.0% and a viscosity of 5000 mPas·s and containing PVA-1 as the dispersant. The PVA-1 content of the emulsion Em-1 was 5% by weight relative to the solid content of the emulsion.

An aqueous solution of 5% sodium naphthalenesulfonate-formaldehyde condensate having a degree of condensation (n) of from 10 to 12 (Sanyo Levelon, manufactured by Sanyo Chemical Co.) was added to the emulsion in an amount of 5 parts by weight (as solid) relative to 100 parts by weight of PVA-1 in the emulsion, to which was added water to prepare an aqueous emulsion composition having a solid concentration of 45%. The fluidity and the initial adhesiveness of the composition were measured and evaluated according to the methods mentioned above. The viscosity-increasing magnification of the composition was 20.

Example 2

To the emulsion Em-1 of Example 1, added was an aqueous solution of 5% sodium naphthalenesulfonate-formaldehyde condensate having a degree of condensation (n) of from 10 to 12 (Sanyo Levelon, manufactured by Sanyo Chemical Co.) in an amount of 0.5 parts by weight (as solid) relative to 100 parts by weight of PVA-1 in the emulsion, to which was added water to prepare an aqueous emulsion composition having a solid concentration of 45%. The fluidity and the initial adhesiveness of the composition were measured and evaluated in the same manner as in Example 1. The viscosity-increasing magnification of the composition was 6.

Example 3

To the emulsion Em-1 of Example 1, added was an aqueous solution of 5% sodium naphthalenesulfonate-formaldehyde condensate having a degree of condensation (n) of from 10 to 12 (Sanyo Levelon, manufactured by Sanyo Chemical Co.) in an amount of 20 parts by weight (as solid) relative to 100 parts by weight of PVA-1 in the emulsion, to which was added water to prepare an aqueous emulsion composition having a solid concentration of 45%. The fluidity and the initial adhesiveness of the composition were measured and evaluated in the same manner as in Example 1. The viscosity-increasing magnification of the composition was 25.

Comparative Example 1

Water was added to Em-1 of Example 1 to prepare an aqueous emulsion having a solid concentration of 45%. Its fluidity and initial adhesiveness were measured and evaluated in the same manner as in Example 1.

Example 4

14.4 g of polyvinyl alcohol (PVA-2, having a degree of polymerization of 1000 and a degree of hydrolysis of 94.2 mol %) was dissolved in 230 g of ion-exchanged water under heat, and the resulting solution was put into a pressure autoclave equipped with a nitrogen blow inlet and a thermometer. After the pH of the solution was adjusted to be 4.0 with diluted sulfuric acid added thereto, 300 g of vinyl acetate was added to the solution, and ethylene was introduced thereinto under an elevated pressure of 45 kg/cm²G. The amount of ethylene added was 60 g. After the temperature of the system was elevated up to 60° C., a redox initiator, hydrogen peroxide-Rongalit was added thereto to initiate the polymerization of the monomers. The polymerization was finished in 2 hours to give a poly(vinyl acetate-ethylene) copolymer emulsion (Em-2) having a solid concentration of 56.2% and a viscosity of 2100 mPas·s and containing PVA-2 as the dispersant. The PVA-2 content ofthe emulsion Em-2 was 4% by weight relative to the solid content of the emulsion.

An aqueous solution of 5% sodium naphthalenesulfonate-formaldehyde condensate having a degree of condensation (n) of from 10 to 12 (Sanyo Levelon, manufactured by Sanyo Chemical Co.) was added to the emulsion Em-2 in an amount of 10 parts by weight (as solid) relative to 100 parts by weight of PVA-2 in the emulsion, to which was added water to prepare an aqueous emulsion composition having a solid concentration of 50%. The fluidity and the initial adhesiveness of the composition were measured and evaluated according to the methods mentioned above. The viscosity-increasing magnification of the composition was 20.

Example 5

A poly(vinyl acetate-ethylene) copolymer emulsion (Em-3) was prepared in the same manner as in Example 4, except that a solution of 14.4 g of PVA-2 and 13.0 g of sodium naphthalenesulfonate-formaldehyde condensate having a degree of condensation (n) of from 10 to 12 (Sanyo Levelon, manufactured by Sanyo Chemical Co.) as dissolved in 250 g of ion-exchanged water was used as the dispersant. The emulsion Em-3 contained 90 parts by weight of the sodium naphthalenesulfonate-formaldehyde condensate having a degree of condensation (n) of from 10 to 12, relative to 100 parts by weight of PVA-2 therein. Water was added to Em-3 to prepare an aqueous emulsion composition having a solid concentration of 50%. The fluidity and the initial adhesiveness of the composition were measured and evaluated according to the methods mentioned above.

Comparative Example 2

Water was added to Em-2 of Example 4 to prepare an aqueous emulsion having a solid concentration of 50%. Its fluidity and initial adhesiveness were measured and evaluated in the same manner as in Example 1.

Comparative Example 3

To the emulsion Em-3 of Example 5, further added was an aqueous solution of 5% sodium naphthalenesulfonate-formaldehyde condensate having a degree of condensation (n) of from 10 to 12 (Sanyo Levelon, manufactured by Sanyo Chemical Co.) in an amount of 20 parts by weight relative to 100 parts by weight of PVA-2 in the emulsion, to which was added water to prepare an aqueous emulsion composition having a solid concentration of 50%. The emulsion composition contained 110 parts by weight of the sodium naphthalenesulfonate-formaldehyde condensate, relative to 100 parts by weight of PVA-2 therein. The fluidity and the initial adhesiveness of the composition were measured and evaluated according to the methods mentioned above.

Example 6

400 g of water and 24 g of thiol-terminated polyvinyl alcohol (PVA-3, having a degree of polymerization of 500 and a degree of hydrolysis of 85.7 mol %) were put into a 1-liter glass polymerizer equipped with a reflux condenser, a dropping funnel, a thermometer and a nitrogen blow inlet, and completely dissolved at 95° C.

Next, the resulting aqueous PVA solution was cooled, adjusted to have a pH of 4.0 with diluted sulfuric acid added thereto, and purged with nitrogen. Then, with stirring the solution at 140 rpm, 80 g of methyl methacrylate and 80 g of n-butyl acrylate were added thereto, and heated up to 70° C. 5 g of an aqueous solution of 5% ammonium persulfate was added thereto to start the polymerization of the monomers. Next, 120 g of methyl methacrylate and 120 g of n-butyl acrylate were added thereto successively over a period of 2 hours. The polymerization was finished in 4 hours to give a poly(methyl methacrylate-butyl acrylate) copolymer emulsion (Em-4) having a solid concentration of 51.5% and a viscosity of 750 mPas·s and containing PVA-3 as the dispersant. The PVA-3 content of the emulsion Em-4 was 6% by weight relative to the solid content of the emulsion.

An aqueous solution of 5% sodium naphthalenesulfonate-formaldehyde condensate having a degree of condensation (n) of from 10 to 12 (Sanyo Levelon, manufactured by Sanyo Chemical Co.) was added to the emulsion Em-4 in an amount of 3 parts by weight (as solid) relative to 100 parts by weight of PVA-3 in the emulsion, to which was added water to prepare an aqueous emulsion composition having a solid concentration of 45%. The fluidity and the initial adhesiveness of the composition were measured and evaluated according to the methods mentioned above. The viscosity-increasing magnification of the composition was 16.

Comparative Example 4

Water was added to Em-4 of Example 6 to prepare an aqueous emulsion having a solid concentration of 45%. Its fluidity and initial adhesiveness were measured and evaluated according to the methods mentioned above.

Example 7

15 g of thiol-terminated, sulfone-modified polyvinyl alcohol (PVA-4, having a degree of polymerization of 300 and a degree of hydrolysis of 98.0 mol %—this contained 10 mol % of sodium allylsulfonate as introduced thereinto through random copolymerization modification) was dissolved in 290 g of ion-exchanged water under heat, and the resulting solution was put into a pressure autoclave equipped with a nitrogen blow inlet and a thermometer. After the pH of the solution was adjusted to be 4.0 with diluted sulfuric acid added thereto, 165 g of styrene was added to the solution, and 135 g of butadiene having been stored in a metering pressure container was introduced thereinto from the container. After the system was heated up to 70° C., 10 g of an aqueous solution of 2% potassium persulfate was introduced thereinto under pressure to initiate the polymerization of the monomers. The inner pressure in the autoclave, 4.8 kg/cm$^2$G, was lowered during the polymerization to be 0.4 kg/cm$^2$G in 15 hours. Thus was prepared a poly(styrene-butadiene) copolymer emulsion (Em-5) having a solid concentration of 49.3% and a viscosity of 1500 mPas·s and containing PVA-4 as the dispersant. The PVA-4 content of the emulsion Em-5 was 5% by weight relative to the solid content of the emulsion.

An aqueous solution of 5% sodium naphthalenesulfonate-formaldehyde condensate having a degree of condensation (n) of from 10 to 12 (Sanyo Levelon, manufactured by Sanyo Chemical Co.) was added to the emulsion (Em-5) in an amount of 10 parts by weight (as solid) relative to 100 parts by weight of PVA4 in the emulsion, to which was added water to prepare an aqueous emulsion composition having a solid concentration of 45%. The fluidity and the initial adhesiveness of the composition were measured and evaluated according to the methods mentioned above. The viscosity-increasing magnification of the composition was 20.

Comparative Example 5

Water was added to Em-5 of Example 7 to prepare an aqueous emulsion having a solid concentration of 45%. Its fluidity and initial adhesiveness were measured and evaluated according to the methods mentioned above.

Comparative Example 6

The same process as in Example 4 was repeated, except that 14.4 g of sodium naphthalenesulfonate-formaldehyde condensate having a degree of condensation (n) of from 10 to 12 (Sanyo Levelon, manufactured by Sanyo Chemical Co.) was used in place of PVA-2. In this, however, the system coagulated and did not give a stable aqueous emulsion.

Comparative Example 7

The same process as in Example 4 was repeated, except that an aqueous solution of 5% sodium naphthalenesulfonate-formaldehyde condensate having a degree of condensation (n) of from 10 to 12 (Sanyo Levelon, manufactured by Sanyo Chemical Co.) was added to the emulsion in an amount of 0.01 parts by weight (as solid) relative to 100 parts by weight of PVA-2 in the emulsion, in place of adding thereto the same aqueous solution in an amount of 10 parts by weight (as solid) relative to 100 parts by weight of PVA-2 in the emulsion. In this, however, a dilatant aqueous emulsion could not be obtained, and the having a degree of condensation (n) of from 10 to 12, to obtain an aqueous emulsion. The fluidity and the initial adhesiveness of the aqueous emulsion obtained herein were measured and evaluated according to the methods mentioned above. The viscosity-increasing magnification of the aqueous emulsion was 14.

TABLE 1

Aqueous Emulsion Composition

| | Dispersoid Monomer | PVA | Dispersant (wt. pts.) Sodium Naphthalenesulfonate-Formaldehyde Condensate added during emulsion polymerization | added after emulsion polymerization | (viscosity at 6 rpm)/- (viscosity at 60 rpm) | Initial Adhesiveness (kg) |
|---|---|---|---|---|---|---|
| Example 1 | Vinyl Acetate | 100 | — | 5 | 0.75 | 4.6 |
| Example 2 | Vinyl Acetate | 100 | — | 0.5 | 0.98 | 3.2 |
| Example 3 | Vinyl Acetate | 100 | — | 20 | 0.51 | 4.4 |
| Comparative Example 1 | Vinyl Acetate | 100 | — | — | 2.5 | 1.7 |
| Example 4 | Vinyl Acetate, Ethylene | 100 | — | 10 | 0.50 | 4.5 |
| Example 5 | Vinyl Acetate, Ethylene | 100 | 90 | — | 0.87 | 4.2 |
| Comparative Example 2 | Vinyl Acetate, Ethylene | 100 | — | — | 2.2 | 1.9 |
| Comparative Example 3 | Vinyl Acetate, Ethylene | 100 | 90 | 20 | Coagulated | |
| Example 6 | Methyl Methacrylate, N-butyl Acrylate | 100 | — | 3 | 0.99 | 3.8 |
| Comparative Example 4 | Methyl Methacrylate, N-butyl Acrylate | 100 | — | — | 2.05 | 1.4 |
| Example 7 | Styrene, Butadiene | 100 | — | 10 | 0.91 | 3.6 |
| Comparative Example 5 | Styrene, Butadiene | 100 | — | — | 2.10 | 1.2 |
| Comparative Example 6 | Vinyl Acetate, Ethylene | — | 100 | — | Coagulated | |
| Comparative Example 7 | Vinyl Acetate, Ethylene | 100 | — | 0.01 | 2.1 | 2.1 |
| Comparative Example 8 | Vinyl Acetate, Ethylene | — | 50 | — | 4.0 | 0.8 |
| Example 8 | Vinyl Acetate, Ethylene | 100 | — | 10 | 0.8 | 3.5 | initial adhesiveness of the emulsion obtained herein was poor.

Comparative Example 8

The same process as in Example 4 was repeated, except that 7.2 g of sodium naphthalenesulfonate-formaldehyde condensate having a degree of condensation (n) of from 10 to 12 (Sanyo Levelon, manufactured by Sanyo Chemical Co.) and 7.2 g of sodium alkyldiphenyl ether disulfonate (Sandet BL, manufactured by Sanyo Chemical Co.) were used in place of PVA-2, to prepare a poly(vinyl acetate-ethylene) copolymer emulsion having a solid concentration of 55.3% and a viscosity of 4800 mPas·s. This was tested in the same manner as in Example 4, resulting in that the emulsion obtained herein was not a dilatant one and that its initial adhesiveness was poor.

Example 8

The same process as in Example 4 was repeated, except that sodium naphthalenesulfonate-formaldehyde condensate having a degree of condensation (n) of from 4 to 5 (Lomar D, manufactured by San Nopco Co.) was used in place of the sodium naphthalenesulfonate-formaldehyde condensate As has been mentioned in detail hereinabove, the aqueous emulsion composition of the present invention is characterized by its fluidity such that the apparent viscosity of the composition is prevented from being lowered relative to the increase in the shear rate of the composition, and that the apparent viscosity of the composition is increased relative to the increase in the shear rate thereof. In addition, the composition is further characterized by its high initial adhesiveness and its viscosity-increasing ability.

Accordingly, the aqueous emulsion composition of the invention is particularly applicable to high-speed coating, and is also effective in various fields such as adhesives for paper, adhesives for wood works, fiber processing agents, paper-coating compositions, paints, etc.

While the invention has been described in detail and with reference to specific embodiments thereof, it will be apparent to one skilled in the art that various changes and modifications can be made therein without departing from the spirit and scope thereof This application is based on Japanese Application No. 150572/1997, filed Jun. 9, 1997, the entire contents of which are hereby incorporated by reference.

What is claimed is:

1. An aqueous emulsion composition comprising:
   a dispersoid, comprising a vinyl ester (co)polymer wherein the copolymerized monomer is polymerized from at least one monomer unit selected from the group consisting of ethylenic unsaturated monomers, dienic monomers, and mixtures thereof;
   a dispersant, comprising:
   (A) a polyvinyl alcohol (co)polymer, and
   (B) a condensate of an alkali metal salt of an aromatic sulfonic acid with formaldehyde;
   wherein the weight ratio of the solid content of (A)/(B) is 100/0.05 to 100/100, and wherein the ethylenic unsaturated monomers and dienic monomers are selected from the group consisting of olefins, vinyl esters, acrylic acid, methacrylic acid, acrylates, methacrylates, acrylamides, methacrylamide, styrenic monomers, N-vinylpyrrolidone, butadiene and isoprene.

2. The aqueous emulsion composition as claimed in claim 1, wherein the condensate (B) has a degree of condensation of 2 to 20.

3. The aqueous emulsion composition as claimed in claim 1, wherein the ethylenic unsaturated monomers and dienic monomers are selected from the group consisting of ethylene, propylene, isobutylene, vinyl formate, vinyl acetate, vinyl propionate, vinyl versatate, acrylic acid, methacrylic acid, methyl acrylate, ethyl acrylate, butyl acrylate, 2-ethylhexyl acrylate, dodecyl acrylate, 2-hydroxyethyl acrylate, methyl methacrylate, ethyl methacrylate, butyl methacrylate, 2-ethylhexyl methacrylate, dodecyl methacrylate, 2-hydroxyethyl methacrylate, dimethylaminoethyl acrylate and its quaternary salt, dimethylaminoethyl methacrylate and its quaternary salt, acrylamide, methacrylamide, N-methylolacrylamide, N,N-dimethylacrylamide, acrylamido-2-methylpropanesulfonic acid and its sodium salt, styrene, α-methylstyrene, p-styrenesulfonic acid and its sodium and potassium salts, N-vinylpyrrolidone, butadiene and isoprene and mixtures thereof.

4. The aqueous emulsion composition as claimed in claim 1, wherein the dispersoid (co)polymer is selected from the group consisting of ethylene-vinyl acetate copolymer and polyvinyl acetate.

5. The aqueous emulsion as claimed in claim 4, wherein the condensate (B) has a degree of condensation of 2 to 20 and wherein the weight ratio of the solid content of (A)/(B) is 100/0.2 to 100/50.

6. The aqueous emulsion composition as claimed in claim 5, wherein the dispersoid (co)polymer is ethylene-vinyl acetate copolymer.

7. The aqueous emulsion composition as claimed in claim 5, wherein the dispersoid (co)polymer is polyvinyl acetate.

8. The aqueous emulsion composition as claimed in claim 1, wherein the polyvinyl alcohol (co)polymer (A) is prepared by polymerizing a vinyl ester monomer followed by hydrolysis.

9. The aqueous emulsion composition as claimed in claim 8, wherein the vinyl ester monomer is selected from the group consisting of vinyl acetate, vinyl formate, vinyl propionate, vinyl versatate, and vinyl pivalate, and mixtures thereof.

10. The aqueous emulsion composition as claimed in claim 1, wherein the polyvinyl alcohol (co)polymer (A) is prepared by copolymerizing a vinyl ester monomer and a copolymerizable comonomer followed by hydrolysis.

11. The aqueous emulsion composition as claimed in claim 10, wherein the copolymerizable comonomer is selected from the group consisting of ethylene, propylene, 1-butene, isobutene, acrylic acid, methyl acrylate, ethyl acrylate, n-propyl acrylate, i-propyl acrylate, n-butyl acrylate, t-butyl acrylate, 2-ethylhexyl acrylate, dodecyl acrylate, octadecyl acrylate, methacrylic acid, methyl methacrylate, ethyl methacrylate, n-propyl methacrylate, i-propyl methacrylate, n-butyl methacrylate, t-butyl methacrylate, 2-ethylhexyl methacrylate, dodecyl methacrylate, octadecyl methacrylate, methyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, acrylonitrile, methacrylonitrile, vinyl chloride, vinylidene chloride, vinyl fluoride, vinylidene fluoride, allyl acetate, allyl chloride, fumaric acid and esters thereof, maleic acid and esters thereof, itaconic acid and esters thereof, maleic anhydride and esters thereof, itaconic anhydride and esters thereof, ethylenesulfonic acid, allylsulfonic acid, methallylsulfonic acid, 2-acrylamido-2-methylpropanesulfonic acid, vinylsilane monomers, vinyltrimethoxysilane, isopropenyl acetate, 3-acrylamidopropyltrimethylammonium chloride, and 3-methacrylamidopropyltrimethylammonium chloride, and mixtures thereof.

12. The aqueous emulsion composition as claimed in claim 10, wherein the comonomer is selected from the group consisting of olefins, vinyl ethers, nitrites, halogenated vinyl monomers, carboxyl group containing monomers and their esters, and sulfonic acid group-containing monomers.

13. The aqueous emulsion composition as claimed in claim 1, wherein the polyvinyl alcohol (co)polymer (A) is a terminal-modified (co)polymer prepared by polymerizing a vinyl ester monomer in the presence of a thiol compound selected from the group consisting of thiol-acetic acid, and mercaptopropionic acid, and mixtures thereof, followed by hydrolysis.

14. The aqueous emulsion composition as claimed in claim 13, wherein the vinyl ester monomer is selected from the group consisting of vinyl acetate, vinyl formate, vinyl propionate, vinyl versatate, and vinyl pivalate, and mixtures thereof.

15. The aqueous emulsion composition as claimed in claim 1, wherein the polyvinyl alcohol (co)polymer (A) has a degree of polymerization between 50 and 8000.

16. The aqueous emulsion composition as claimed in claim 1, wherein the polyvinyl alcohol (co)polymer (A) has a degree of hydrolysis not smaller than 50 mol %.

17. A method of preparing the aqueous emulsion composition as claimed in claim 1, comprising:
    in the presence of a dispersant comprising (A) a polyvinyl alcohol (co)polymer,
    preparing a vinyl ester (co)polymer dispersoid by emulsion polymerizing a vinyl ester with, in the case of the preparation of a copolymer, at least one monomer unit selected from the group consisting of ethylenic unsaturated monomers, dienic monomers, and mixtures thereof as recited in claim 1; and
    adding (B) a condensate of an alkali metal salt of an aromatic sulfonic acid with formaldehyde;
    wherein a weight ratio of the solid content of (A)/(B) is 100/0.05 to 100/100.

18. The method as claimed in claim 17, wherein the condensate (B) has a degree of condensation of 2 to 20.

19. An aqueous emulsion composition comprising:
    a dispersoid, comprising a vinyl ester (co)polymer wherein the copolymerized monomer is polymerized from at least one monomer unit selected from the group consisting of ethylenic unsaturated monomers, dienic monomers, and mixtures thereof;

a dispersant, comprising:
  (A) a polyvinyl alcohol (co)polymer, and
  (B) a condensate selected from the group consisting of sodium naphthalenesulfonate-formaldehyde condensate, sodium α-naphthalenesulfonate-formaldehyde condensate, sodium β-naphthalenesulfonate-formaldehyde condensate, sodium benzenesulfonate-formaldehyde condensate, and sodium lignosulfonate-formaldehyde condensate, a condensate of an alkali metal salt of a heterocyclic sulfonic acid with formaldehyde, a condensate of an alkali metal melaminesulfonate with formaldehyde, and mixtures thereof,
wherein the weight ratio of the solid content of(A)/(B) is 100/0.05 to 100/100, and wherein the ethylenic unsaturarated monomers and dienic monomers are selected from the group consisting of olefins, vinyl esters, acrylic acid, methacrylic acid, acrylates, methacrylates, acrylamides, methacrylamide, styrenic monomers, N-vinylpyrrolidone, butadiene, and isoprene.

20. A method for thickening an aqueous emulsion, comprising:
  adding to an aqueous emulsion a condensate (B) of an alkali metal salt of an aromatic sulfonic acid with formaldehyde, wherein said aqueous emulsion comprises:
    a dispersoid, comprising a vinyl ester (co)polymer wherein the copolymerized monomer is polymerized from at least one monomer unit selected from the group consisting of ethylenic unsaturated monomers, dienic monomers, and mixtures thereof, and wherein the ethylenic unsaturated monomers are selected from the group consisting of olefins, vinyl esters, acrylic acid, methacrylic acid, acrylates, methacrylates, acrylamides, methacrylamide, styrenic monomers and N-vinylpyrrolidone; and
    a dispersant, comprising:
      (A) a polyvinyl alcohol (co)polymer wherein a weight ratio of the solid content of (A)/(B) is 100/0.05 to 100/100.

21. An aqueous emulsion composition produced by a method for thickening an aqueous emulsion comprising:
  adding to an aqueous emulsion:
    a condensate (B) selected from the group consisting of sodium naphthalenesulfonate-formaldehyde condensate, sodium α-naphthalenesulfonate-formaldehyde condensate, sodium β-naphthalenesulfonate-formaldehyde condensate, sodium benzenesulfonate-formaldehyde condensate, sodium lignosulfonate-formaldehyde condensate, a condensate of an alkali metal salt of a heterocyclic sulfonic acid with formaldehyde, and a condensate of an alkali metal melaminesulfonate with formaldehyde, and mixtures thereof,
  wherein said aqueous emulsion comprises;
    a dispersoid, comprising a vinyl ester (co)polymer wherein the copolymerized monomer is polymerized from at least one monomer unit selected from the group consisting of ethylenic unsaturated monomers, dienic monomers, and mixtures thereof, and wherein the ethylenic unsaturated monomers and dienic monomers are selected from the group consisting of olefins, vinyl esters, acrylic acid, methacrylic acid, acrylates, methacrylates, acrylamides, methacrylamide, styrenic monomers, N-vinylpyrrolidone, butadiene, and isoprene; and
    a dispersant, comprising:
      (A) a polyvinyl alcohol (co)polymer wherein a weight ratio of the solid content of (A)/(B) is 100/0.05 to 100/100.

* * * * *

UNITED STATES PATENT AND TRADEMARK OFFICE
CERTIFICATE OF CORRECTION

PATENT NO.      : 6,221,952 B1                                        Page 1 of 1
APPLICATION NO. : 09/093343
DATED           : April 24, 2001
INVENTOR(S)     : Masato Nakamae It is certified that error appears in the above-identified patent and that said Letters Patent is hereby corrected as shown below:

Column 14, line 24, "nitrites" should read --nitriles--

Signed and Sealed this

Twenty-fourth Day of October, 2006

JON W. DUDAS
*Director of the United States Patent and Trademark Office*